United States Patent
Hung et al.

(10) Patent No.: US 10,821,413 B2
(45) Date of Patent: Nov. 3, 2020

(54) MICROPARTICLE FORMING DEVICE

(71) Applicant: METAL INDUSTRIES RESEARCH & DEVELOPMENT CENTRE, Kaohsiung (TW)

(72) Inventors: Cheng-Han Hung, Kaohsiung (TW); Zong-Hsin Liu, Kaohsiung (TW); Ming-Fang Tsai, Kaohsiung (TW); Ying-Chieh Lin, Kaohsiung (TW); Chiu-Feng Lin, Kaohsiung (TW); Ying-Cheng Lu, Kaohsiung (TW); Yao-Kun Huang, Kaohsiung (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 452 days.

(21) Appl. No.: 15/852,177

(22) Filed: Dec. 22, 2017

(65) Prior Publication Data
US 2019/0193043 A1 Jun. 27, 2019

(51) Int. Cl.
*B01J 19/00* (2006.01)
*B01J 13/06* (2006.01)
*B01J 19/26* (2006.01)

(52) U.S. Cl.
CPC .......... *B01J 19/0093* (2013.01); *B01J 13/06* (2013.01); *B01J 19/26* (2013.01); *B01J 2219/00245* (2013.01); *B01J 2219/00889* (2013.01); *B01J 2219/00894* (2013.01)

(58) Field of Classification Search
CPC ............ B01J 19/0093; B01J 19/26; B01J 2219/00894; B01J 13/06; B01J 2219/00245; B01J 2219/00889
See application file for complete search history.

(56) References Cited

U.S. PATENT DOCUMENTS 8,187,554 B2 * 5/2012 Panagiotou ........... B01F 5/0256
366/160.3
2018/0099256 A1 4/2018 Liu et al.
2018/0110736 A1 4/2018 Hung et al.
2018/0161278 A1 6/2018 Hung et al.

FOREIGN PATENT DOCUMENTS

TW 200909072 A 3/2009
TW I587925 B 6/2017
TW I599408 9/2017

* cited by examiner

*Primary Examiner* — Anshu Bhatia
(74) *Attorney, Agent, or Firm* — Alan D. Kamrath; Karin L. Williams; Mayer & Williams PC

(57) ABSTRACT

A microparticle forming device is used to form microparticles with uniform particle size and proper roundness, and includes a collection pipe, a fluid nozzle, a reactor and a filter. The collection pipe includes a fluid passage, an aqueous-phase fluid inlet, an oil-phase fluid inlet and a mixed fluid outlet, all of which communicate with the fluid passage. The oil-phase fluid inlet is located between the aqueous-phase fluid inlet and the mixed fluid outlet. The fluid nozzle has a plurality of oil-phase fluid drop outlets aligned with the oil-phase fluid inlet of the collection pipe. The reactor has a reaction chamber communicating with the mixed fluid outlet of the collection pipe, a mixing member accommodated in the reaction chamber, and a microparticle collection port communicating communicated with the reaction chamber. Two opposite ends of the filter respectively communicate with the reaction chamber of the reactor.

4 Claims, 2 Drawing Sheets

MICROPARTICLE FORMING DEVICE

BACKGROUND OF THE INVENTION

1. Field of the Invention

The present invention relates to a microparticle forming device and, more particularly, to a microparticle forming device for producing microparticles with uniform particle size and proper roundness.

2. Description of the Related Art

A microparticle as is also known as microsphere generally refers to the particle size ranged from 1 to 1000 μm of small spherical particle and is often used as a microcarrier for drug release. With the characteristics of targeting, controlled release, stability, invariability and surface modification, forming microparticles has become one of the emerging drug administration technologies.

Because the particle size of the microparticle is so small, it has been the primary goal to determine how to produce the microparticles with uniform particle size and proper roundness so that every microparticle can have a consistent drug-releasing effect. Please refer to FIG. 1, in which the conventional microparticle forming device 9 comprises a piezoelectric nozzle 91 and two electric field generating members 92, 93. Fluid can be ejected in the form of a liquid jet through the operation of the piezoelectric nozzle 91. When the liquid jet passes between the two electric field generating members 92, 93, it is broken into a plurality of droplets under the pulling of the electrostatic force of the two electric field generating members 92, 93. The plurality of droplets can be solidified to form a plurality of microparticles. An embodiment similar to that of the conventional microparticle forming device 9 has been disclosed in the patent application No. 201617135 of the Republic of China (later granted as patent No. I587925).

Although the shape, diameter and density of the plurality of droplets can be adjusted by further changing the piezoelectric pulse of the piezoelectric nozzle 91, adjusting the ejection velocity and ejection quantity of the liquid jet, and changing the magnitude of the electrostatic force of the two electric field generating members 92, 93 the microparticles formed by the conventional microparticle forming device 9 still have the problems of inconsistent particle sizes and poor roundness. For this reason, it is indeed necessary to provide a kind of novel microparticle forming device to solve the above problems.

SUMMARY OF THE INVENTION

A microparticle forming device of the invention includes a collection pipe, a fluid nozzle, a reactor and a filter. The collection pipe has a fluid passage therein. The collection pipe also has an aqueous-phase fluid inlet, an oil-phase fluid inlet and a mixed fluid outlet thereon, all of which are communicated with the fluid passage. The oil-phase fluid inlet is located between the aqueous-phase fluid inlet and the mixed fluid outlet. The fluid nozzle has a plurality of oil-phase fluid drop outlets aligned with the oil-phase fluid inlet of the collection pipe. The reactor has a reaction chamber therein communicated with the mixed fluid outlet of the collection pipe, a mixing member accommodated in the reaction chamber and a microparticle collection port communicated with the reaction chamber. Two opposite ends of the filter respectively communicate with the reaction chamber of the reactor.

Accordingly, by means of the aqueous-phase fluid inlet, the oil-phase fluid inlet and the mixed fluid outlet arranged on the collection pipe, a plurality of oil-phase droplets formed by the oil-phase fluid can be pre-distributed in the aqueous-phase fluid in the collection pipe, then flow along with the aqueous-phase fluid through the mixed fluid outlet into the reactor for emulsification reaction to form a plurality of microparticles. Therefore, the microparticle forming device of the present invention can achieve the effect of forming microparticles with uniform particle size and proper roundness. Further, by means of the two opposite ends of the filter respectively communicating with the reaction chamber, the organic solvent dissolved in the aqueous-phase fluid can be removed. Therefore, the emulsification reaction can maintain a certain effect and achieve the effect of avoiding organic solvent interference.

It is one object of the present invention to provide a microparticle forming device for producing microparticles with uniform particle size and proper roundness.

It is another object of the present invention to provide a microparticle forming device in which the collection pipe includes a propelling member disposed in the fluid passage, thereby effectively promoting the flow of the aqueous-phase fluid to the reactor.

It is still another object of the present invention to provide a microparticle forming device in which the fluid nozzle is connected with an oil-phase fluid source and a buffer member is installed between the fluid nozzle and the oil-phase fluid source, so that the oil-phase fluid supplied by the oil-phase fluid source can effectively flow to the fluid nozzle at a steady rate.

It is a further object of the present invention to provide a microparticle forming device in which the filter is a tangential flow filtrator, thereby effectively improving the filtration efficiency and prolonging the service life.

It is still a further object of the present invention to provide a microparticle forming device in which the fluid nozzle uses the standing wave effect to induce the directional micro droplets spray. In this way, the particle size of the plurality of oil-phase droplets formed by the fluid nozzle can be reduced so as to achieve the effect of producing uniform micron scale or nanometer scale microparticles.

DETAILED DESCRIPTION OF THE INVENTION

Figure 1:
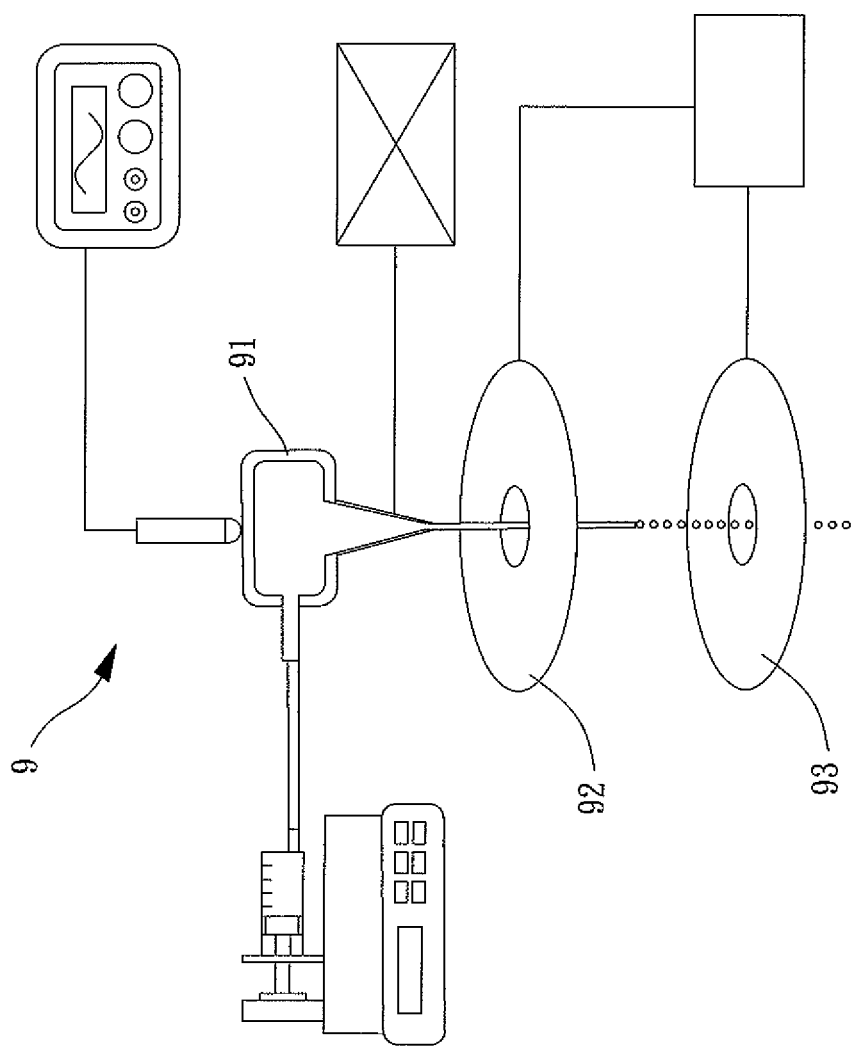
FIG. 1 is a schematic diagram of a conventional microparticle forming device.

In order to make the above mentioned and other objects, features and advantages of the present invention more obvious and easy to understand, the following is a detailed description of an illustrative embodiment described in connection with the drawing.

Figure 2:
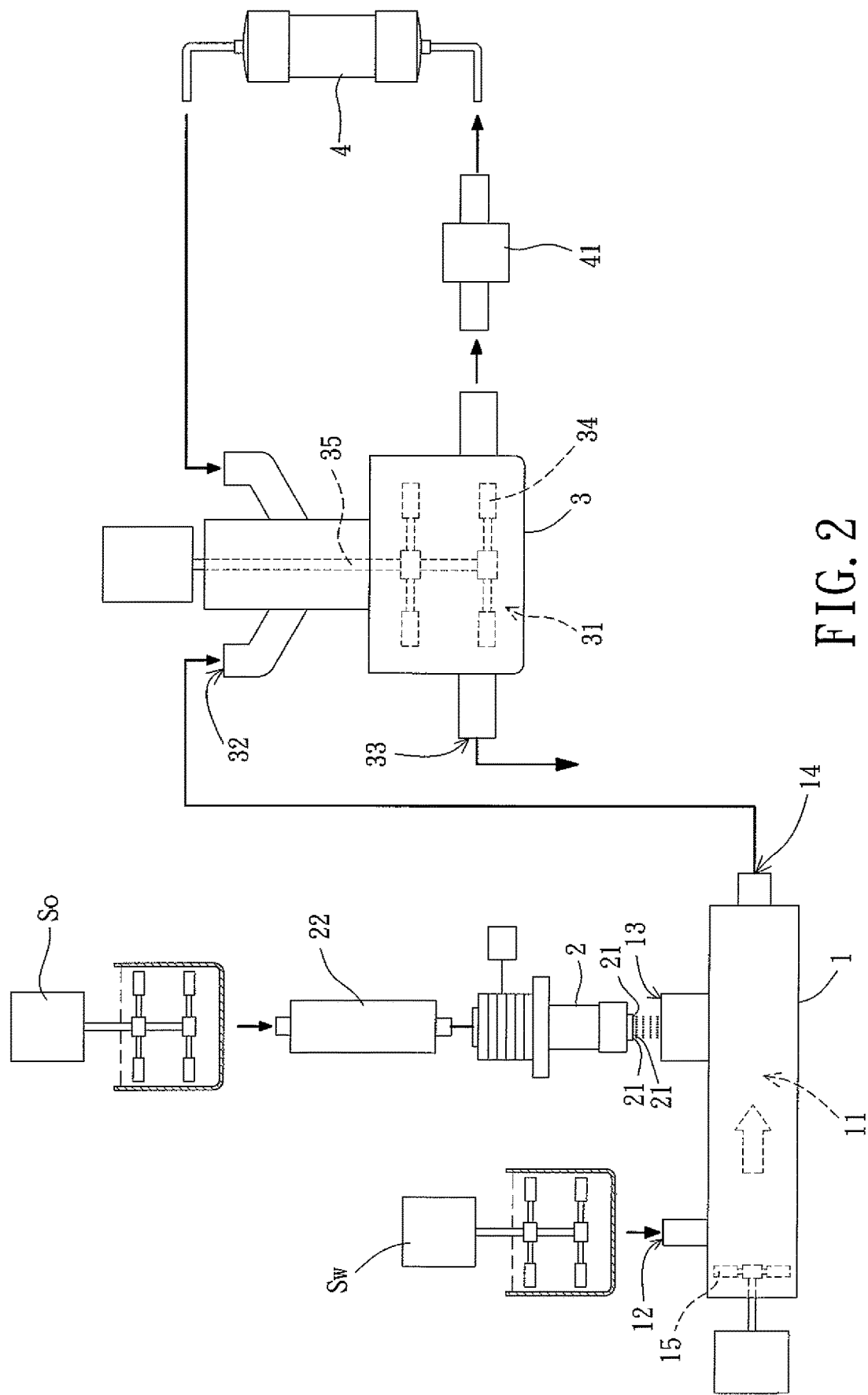
FIG. 2 is a schematic diagram of a microparticle forming device according to a preferred embodiment of the present invention.

FIG. 2 shows a preferred embodiment of a microparticle forming device according to the present invention. The microparticle forming device includes a collection pipe 1, a fluid nozzle 2, a reactor 3 and a filter 4. The fluid nozzle 2 is aligned with the collection pipe 1. The collection pipe 1, the reactor 3 and the filter 4 communicate with each other.

Specifically, the collection pipe 1 has a fluid passage 11 therein for fluid circulation. The collection pipe 1 also has an aqueous-phase fluid inlet 12, an oil-phase fluid inlet 13 and a mixed fluid outlet 14 thereon, all of which communicate with the fluid passage 11. The collection pipe 1 communicates with the reactor 3 via the mixed fluid outlet 14. Therefore, an aqueous-phase fluid and an oil-phase fluid can respectively flow through the corresponding aqueous-phase fluid inlet 12 and the oil-phase fluid inlet 13 into the fluid passage 11. Mixed fluid containing the aqueous-phase fluid and the oil-phase fluid can flow to the reactor 3 through the mixed fluid outlet 14.

In this embodiment, the aqueous-phase fluid produced by an aqueous-phase fluid source $S_W$ can flow into the fluid passage 11 through the aqueous-phase fluid inlet 12 and flow to the reactor 3 through the mixed fluid outlet 14. The aqueous-phase fluid source $S_W$ can be stirred before flowing into the aqueous-phase fluid inlet 12. A blade unit can be used to stir the aqueous-phase fluid source $S_W$. Alternatively, an ultrasonic device can be provided to stir or oscillate the aqueous-phase fluid source $S_W$. Also, the oil-phase fluid inlet 13 is aligned with the fluid nozzle 2 and located between the aqueous-phase fluid inlet 12 and the mixed fluid outlet 14, so that a plurality of oil-phase droplets formed by the fluid nozzle 2 can fall into the fluid passage 11 through the oil-phase fluid inlet 13 and flow along with the aqueous-phase fluid through the mixed fluid outlet 14 to the reactor 3.

In addition, the collection pipe 1 may include a propelling member 15 disposed in the fluid passage 11 to further promote the flow of the aqueous-phase fluid and to permit the aqueous-phase fluid to flow through the mixed fluid outlet 14 to the reactor 3. For example, the propelling member 15 can be a blade unit, but the design of the blade unit is understood by those who have common knowledge in the technical field of the invention and therefore is not illustrated in detail.

The fluid nozzle 2 is connected with an oil-phase fluid source $S_O$, so that the oil-phase fluid supplied by the oil-phase fluid source $S_O$ can form the plurality of oil-phase droplets through the fluid nozzle 2. Specifically, the fluid nozzle 2 includes a plurality of oil-phase fluid drop outlets 21 aligned with the oil-phase fluid inlet 13 of the collection pipe 1. The plurality of oil-phase droplets is formed by the oil-phase fluid through the plurality of oil-phase fluid drop outlets 21 of the fluid nozzle 2. The plurality of oil-phase droplets falls into the fluid channel 11 of the collection pipe 1 through the oil-phase fluid inlet 13 and distributes in the aqueous-phase fluid. The fluid nozzle 2 can be any of a variety of known fluid nozzles, which is preferably the one that induces directional micro droplets spray under the standing wave effect (capillary wave). In this way, the particle size of the plurality of oil-phase droplets formed by the fluid nozzle 2 can be reduced so as to achieve the effect of producing uniform micron scale or nanometer scale microparticles. For example, the patent application Nos. 105132934, 105134610 (later granted as patent No. I599408), 105134449 and 105138670 of the Republic of China have disclosed the fluid nozzles, but should not be limited to these.

In this embodiment, a buffer member 22 can be provided between the fluid nozzle 2 and the oil-phase fluid source $S_O$, so that the oil-phase fluid supplied by the oil-phase fluid source $S_O$ can flow to the fluid nozzle 2 at a steady rate. Thus, the particle size of the plurality of oil-phase droplets formed from the plurality of oil-phase fluid drop outlets 21 can be more uniform. Besides, the oil-phase fluid source $S_O$ can be stirred before flowing into the buffer member 22. A blade unit can be used to stir the oil-phase fluid source $S_O$. Alternatively, an ultrasonic device can be provided to stir or oscillate the oil-phase fluid source $S_O$.

The reactor 3 has a reaction chamber 31 therein communicating with a reaction fluid inlet 32 and a microparticle collection port 33. The reaction fluid inlet 32 is communicated with the fluid passage 11 through the mixed fluid outlet 14 of the collection pipe 1, so that the aqueous-phase fluid having the plurality of oil-phase droplets can flow into the reaction chamber 31 through the reaction fluid inlet 32. For the convenience of subsequent illustration, hereafter the "aqueous-phase fluid having the plurality of oil-phase droplets" will be abbreviated as "mixed fluid".

The reactor 3 has a mixing member 34 accommodated in the reaction chamber 31. The mixing member 34 can also be a blade unit rotated by a rotatable shaft 35 to stir the mixed fluid flowing into the reaction chamber 31, so that the plurality of oil-phase droplets can be evenly distributed in the aqueous-phase fluid to thereby form the plurality of microparticles through the emulsification reaction in the aqueous-phase fluid. In this way, the plurality of microparticles can be obtained from the microparticle collection port 33.

The oil-phase fluid may contain an organic solvent. When the plurality of oil-phase droplets formed by the oil-phase fluid is distributed in the aqueous-phase fluid, the organic solvent in the oil-phase fluid will dissolve in the aqueous-phase fluid, which changes the composition of the aqueous-phase fluid and thereby affects the effect of the emulsification reaction. Thus, in the present embodiment, the microparticle forming device can further contain a filter 4 having two opposite ends respectively communicating with the reaction chamber 31 of the reactor 3, so that the aqueous-phase fluid in the reaction chamber 31 can flow to the filter 4 under the operation of a pump 41 to remove the organic solvent dissolved in the aqueous-phase fluid. The aqueous-phase fluid free of the organic solvent can be directed back into the reaction chamber 31. In the present embodiment, the filter 4 is a tangential flow filtrator which has better filtration efficiency and longer service life.

Accordingly, during the use of the microparticle forming device of the embodiment, the aqueous-phase fluid source $S_W$ can be opened first so that the aqueous-phase fluid can flow into the fluid passage 11 through the aqueous-phase fluid inlet 12. Then, the oil-phase fluid source $S_O$ is opened so that the oil-phase fluid is directed through the plurality of oil-phase fluid drop outlets 21 of the fluid nozzle 2 to form the plurality of oil-phase droplets. The plurality of oil-phase droplets falls into the aqueous-phase fluid in the fluid passage 11 through the oil-phase fluid inlet 13 and flows along with the aqueous-phase fluid to the reaction chamber 31 of the reactor 3 through the mixed fluid outlet 14. In this way, the plurality of oil-phase droplets can be evenly distributed in the aqueous-phase fluid, and the plurality of microparticles is formed by the emulsification reaction in the aqueous-phase fluid. Finally, the plurality of microparticles can be obtained from the microparticle collection port 33.

When the microparticle forming device of the embodiment has been used for a period of time, the filter 4 can be further started to extract the aqueous-phase fluid from the reaction chamber 31 and to remove the organic solvent dissolved in the aqueous-phase fluid. The aqueous-phase fluid free of the organic solvent can be re-directed back into the reaction chamber 31. In this way, the concentration of the organic solvent in the aqueous-phase fluid can remain a certain value, maintaining the effect of the emulsification reaction.

In conclusion, by means of the aqueous-phase fluid inlet, the oil-phase fluid inlet and the mixed fluid outlet arranged on the collection pipe, the plurality of oil-phase droplets formed by the oil-phase fluid can be pre-distributed in the aqueous-phase fluid in the collection pipe and then can flow along with the aqueous-phase fluid into the reactor through the mixed fluid outlet for the emulsification reaction to form in the plurality of microparticles. Therefore, the microparticle forming device of the present invention can achieve the effect of forming the microparticles with uniform particle size and proper roundness. Further, by means of the two opposite ends of the filter respectively communicating with the reaction chamber, the organic solvent dissolved in the aqueous-phase fluid can be removed. Therefore, the emulsification reaction can maintain a certain effect and achieve the effect of avoiding organic solvent interference.

While the preferred embodiment of the invention has been set forth for the purpose of disclosure, however, it is not intended to limit the invention, modifications of the disclosed embodiment of the invention may occur to those skilled in the art. Accordingly, the appended claims are intended to cover the embodiment which does not depart from the spirit and scope of the invention.

What is claimed is:

1. A microparticle forming device comprising:
   a collection pipe including a fluid passage, an aqueous-phase fluid inlet, an oil-phase fluid inlet and a mixed fluid outlet, wherein the fluid passage, the aqueous-phase fluid inlet, the oil-phase fluid inlet and the mixed fluid outlet are communicated with the fluid passage, and wherein the oil-phase fluid inlet is located between the aqueous-phase fluid inlet and the mixed fluid outlet;
   a fluid nozzle including a plurality of oil-phase fluid drop outlets aligned with the oil-phase fluid inlet of the collection pipe;
   a reactor including a reaction chamber communicated with the mixed fluid outlet of the collection pipe, a mixing member accommodated in the reaction chamber, and a microparticle collection port communicated with the reaction chamber; and
   a tangential flow filter, including two opposite ends respectively communicating with the reaction chamber of the reactor.

2. The microparticle forming device as claimed in claim 1, wherein the collection pipe includes a propelling member disposed in the fluid passage.

3. The microparticle forming device as claimed in claim 1, wherein the fluid nozzle is connected with an oil-phase fluid source, and wherein a buffer member is installed between the fluid nozzle and the oil-phase fluid source.

4. The microparticle forming device as claimed in claim 1, wherein the fluid nozzle induces directional micro droplets spray under a standing wave effect.

* * * * *